（12) United States Patent
Makowski et al.

(10) Patent No.: US 9,042,734 B2
(45) Date of Patent: May 26, 2015

(54) LASER RELAY FOR FREE SPACE OPTICAL COMMUNICATIONS

(71) Applicant: RAYTHEON COMPANY, Waltham, MA (US)

(72) Inventors: Maciej D. Makowski, Redondo Beach, CA (US); Gary D. Coleman, Redondo Beach, CA (US); William J. Miniscalco, Sudbury, MA (US); Stephen D. Nordel, Torrance, CA (US)

(73) Assignee: RAYTHEON COMPANY, Waltham, MA (US)

( * ) Notice: Subject to any disclaimer, the term of this patent is extended or adjusted under 35 U.S.C. 154(b) by 373 days.

(21) Appl. No.: 13/855,602

(22) Filed: Apr. 2, 2013

(65) Prior Publication Data

US 2014/0294399 A1    Oct. 2, 2014

(51) Int. Cl.

| H04B 10/00 | (2013.01) |
|---|---|
| H04B 10/10 | (2006.01) |
| H04B 10/29 | (2013.01) |
| H04B 10/11 | (2013.01) |
| H04B 10/112 | (2013.01) |
| H04B 10/118 | (2013.01) |

(52) U.S. Cl.
CPC .............. *H04B 10/11* (2013.01); *H04B 10/29* (2013.01); *H04B 10/1123* (2013.01); *H04B 10/118* (2013.01)

(58) Field of Classification Search
CPC . H04B 10/11; H04B 10/1125; H04B 10/1121
USPC .................................. 398/126, 118, 130, 131
See application file for complete search history.

(56) References Cited

U.S. PATENT DOCUMENTS

| 6,297,897 | B1* | 10/2001 | Czichy et al. | 398/122 |
|---|---|---|---|---|
| 6,839,520 | B1* | 1/2005 | Dreischer et al. | 398/121 |
| 7,277,641 | B1* | 10/2007 | Gleckman | 398/128 |
| 2002/0153497 | A1* | 10/2002 | Pepper et al. | 250/495.1 |
| 2002/0196506 | A1* | 12/2002 | Graves et al. | 359/172 |
| 2003/0053164 | A1* | 3/2003 | Stappaerts | 359/110 |
| 2003/0194238 | A1* | 10/2003 | Yafuso | 398/130 |
| 2005/0063706 | A1* | 3/2005 | Lynch et al. | 398/118 |
| 2007/0031151 | A1* | 2/2007 | Cunningham et al. | 398/131 |
| 2014/0294399 | A1* | 10/2014 | Makowski et al. | 398/126 |

OTHER PUBLICATIONS

Chan, "Optical Space Communications", IEEE Journal of Selected Topics in Quantum Electronics, IEEE Service Center, Piscataway, NJ, US, vol. 6, No. 6, Nov. 1, 2000 (pp. 959-975).

(Continued)

*Primary Examiner* — Oommen Jacob
(74) *Attorney, Agent, or Firm* — Christie, Parker & Hale, LLP

(57) ABSTRACT

A laser relay module for free space optical communications including an optical telescope for receiving and transmitting optical beams; an optical diplexer for separating transmitting and received optical beams; an optical amplifier; a modulated beacon laser for line of sight control of a plurality of communicating remote network nodes; a beacon beam detector for detecting an incoming beacon optical beam for line of sight control of the optical telescope and receiving data from other network nodes; and means for inserting an output of the modulated beacon laser into the optical telescope for transmission to another network node, and for transporting the incoming beacon optical beam to the beacon detector.

20 Claims, 5 Drawing Sheets

(56) References Cited

OTHER PUBLICATIONS

Bonek, et al., "$CO_2$ Laser Communication Technology for Intersatellite Data Links", ESA Journal Noordwijk, NL, vol. 5, No. 2, Jan. 1, 1981 (pp. 83-98).

Fischer, et al., "Advanced Optical Solutions for Inter-Satellite Communications", Optik, Wissenschaftliche Verlag GmbH, De, vol. 112, No. 9, Jan. 1, 2001 (pp. 442-448).

Written Opinion of the International Searching Authority for International Application No. PCT/US2014/014302, filed Jan. 31, 2014, Written Opinion of the International Searching Authority mailed Apr. 9, 2014 (7 pgs.).

International Search Report for International Application No. PCT/US2014/014302, filed Jan. 31, 2014, International Search Report dated Mar. 31, 2014 and mailed Apr. 9, 2014 (3 pgs.).

Bayaki, Ehsan et al.; "EDFA-Based All-Optical Relaying in Free-Space Optical Systems"; 2011; IEEE; 5pp.

* cited by examiner

LASER RELAY FOR FREE SPACE OPTICAL COMMUNICATIONS

FIELD OF THE INVENTION

The present invention relates to a laser relay for free space optical communications.

BACKGROUND

There is an increasing demand for optical networks and optical communication between nodes of such networks, because the increased global demand for high speed data exchange. For example, the use of the Internet worldwide is ever increasing with a high growth rate in the developing countries around the world. However, many emerging business centers in regions near the Equator are handicapped by poor connectivity to the Internet. These centers are typically located in countries with limited national high bandwidth network infrastructure, and sometimes surrounded by either hostile neighbors or inhospitable terrain that makes terrestrial and undersea cable connections impractical.

Nevertheless, there is a continuing demand for high bandwidth connectivity to the Internet in these countries. Many of the most rapidly growing markets are both near the Equator and poorly connected via undersea cables. For some of the larger countries, the internal network infrastructure is relatively primitive. Furthermore, natural disasters can also disrupt connections, and the ability to rapidly reconfigure a communication network to reconnect the affected areas can be extremely valuable. In addition to the underserved markets, the major global telecom carriers of significant and growing wholesale bandwidth have needs for backup and replacement bandwidth to maintain Quality of Service agreements.

All prior attempts at lasercom in space have used an optical to electrical to optical (O-E-O) approach, with the incoming optical signal converted to an electrical signal and then converted back to an outgoing optical signal. That is, all conventional space optical communications systems have an electronic receiver at each node of the system and therefore require an optical-to-electronic conversion.

Furthermore, the prior art approaches do not package the system in a modular fashion and therefore the resulting system is not practical for use in, for example, space and airborne platforms, because such systems have a substantially greater weight, require more power, and cost more. Accordingly, only one or two of the previous designs can be supported by a commercial spacecraft.

Moreover, conventional embodiments of the payload have separate optical and laser structures with complex interconnect cabling between them. Another conventional approach considered was a distributed approach with laser and electronic components mounted within the bus structure of a spacecraft. However, both of these arrangements prove difficult to manufacture and integrate, because they require a large number of unique parts which is a substantial cost driver.

SUMMARY

The laser relay module (LRM) of the present invention is much more efficient in terms of size, weight and power usage. The new design according to the present invention allows 12 LRMs or more per spacecraft.

In some embodiments, the present invention is an LRM for free space optical communications. The LRM includes an optical telescope mounted on a steerable mount for receiving and transmitting optical beams; an optical diplexer for separating transmitting and received optical beams; an optical amplifier for restoring a signal level of the received optical beam to a predetermined level for a transmitting beam; a modulated beacon laser for line of sight control of a plurality of communicating remote network nodes, and for optical transmission of status, system management, and telemetry data to other network nodes; a beacon beam detector for detecting an incoming beacon optical beam for line of sight control of the optical telescope and receiving status, system management, and telemetry data from other network nodes; and means for inserting an output of the modulated beacon laser into the optical telescope for transmission to another network node, and for collecting the incoming beacon optical beam at the optical telescope and transporting the incoming beacon optical beam to the beacon detector.

In some embodiments, each laser relay module may utilize circular polarization or spectral diversity to provide dual optical signal paths. In some embodiments, each laser relay module may include beam steering mirrors to compensate for jitter and position differences of other optical nodes in an optical network.

In the case of a satellite as the platform for the LRM, the one or more of the up/down-link telescopes of a given LRM in a given satellite may be configured to continuously and in real time track at least two respective ground optical telescopes of the given ground site, for example, by using an optical beacon. In some embodiments, a single up/down-link telescope of the given satellite may be configured to track said at least two respective ground optical telescopes of the given ground site using circular polarization or spectral diversity.

In some embodiments, each up/down link optical telescope may include dual internal steering mirrors to maintain track on said at least two respective ground optical telescopes of the given ground site.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

The present invention will now be described more fully with reference to the accompanying drawings, in which exemplary embodiments thereof are shown. The invention may, however, be embodied in many different forms and should not be construed as being limited to the embodiments set forth herein. Rather, these embodiments are provided so that this disclosure is thorough and complete, and will fully convey the concept of the present invention to those skilled in the art.

In some embodiments, the present invention is directed to a laser relay module (LRM) for free space optical communications. The optical hardware of the laser relay is designed to be as agnostic as possible about future evolution of optical communication standards, so it doesn't become obsolete over time. For example, in the case of space optical communication, the ground hardware can be upgraded incrementally to support higher bandwidths or any changes in the standards. Although, most of the platform examples provided herein refer to spacecraft platforms, the LRM of the present invention is not limited to satellite application and can be deployed in various optical communication systems and networks, such as airborne, ground, and/or waterborne platforms.

In some embodiments, the LRM is a self-contained device that is used to acquire and track transmission of optical signals, receive the optical signals, convert them from free space to fiber optic transport, (pre) amplify the optical signals, filter, send them to an optical router if desired, perform high power optical amplification, covert the optical signals back to free space, and transmit the optical signals to intended destinations. In some embodiments, the LRM includes a beam expander, transfer optics, multi-axis gimbals, low noise optical amplifier (LNA), programmable notch filter, booster optical amplifier, power optical amplifier, radiator, integrating structure, and fiber optic & electrical interconnects.

In some embodiments, the LRM may be replicated a desired number of times on a desired platform (e.g., a satellite), based on number of simultaneous connections. Some other payload components (and corresponding functions) of the LRM are: a command and control processor, a line of sight processor, and an optical router or switch. These components are centrally located for ease of integration. The modular approach uses significantly fewer parts and has straight forward interfaces. The added benefit of this approach is that it is transportable to different platforms such as a customer's airborne or orbital satellite or ground fixed or mobile installation. That is the LRM can be used in different locations within the system to cost effectively reconfigure the network.

Figure 1:
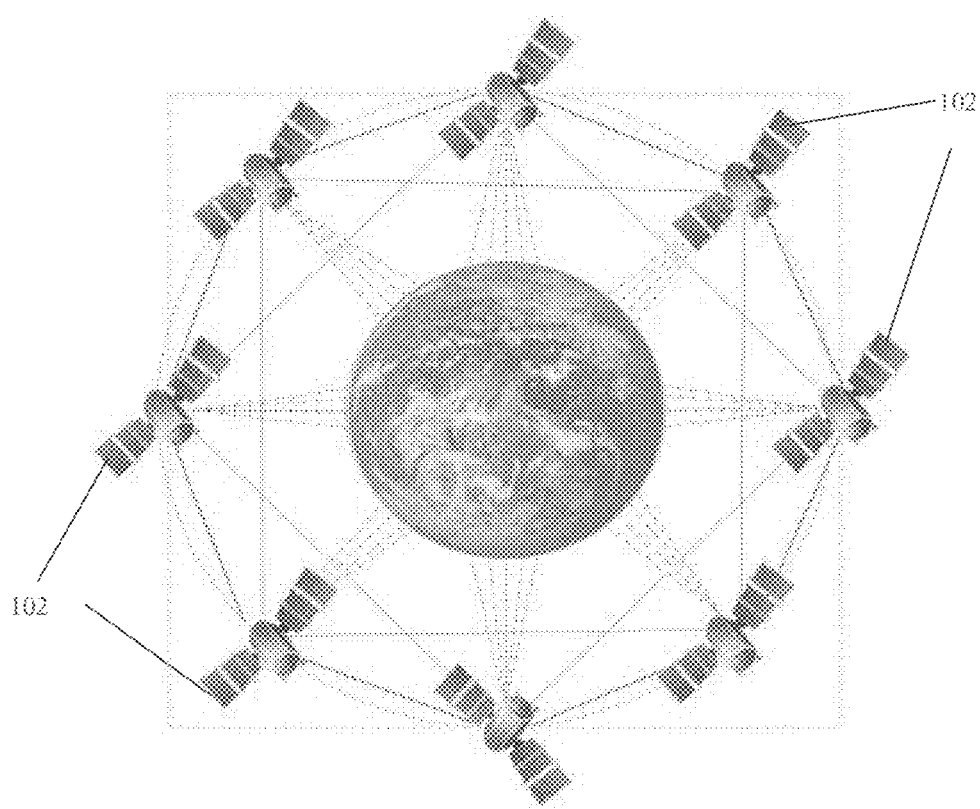
FIG. 1 shows an exemplary MEO constellation of a plurality of satellites with optical communication, according to some embodiments of the present invention.

FIG. 1 shows an exemplary MEO constellation 100 of a plurality of satellites 102, in which a plurality of LRMs of the present invention are deployed. As shown, eight satellites 102 (8-ball constellation) are arranged and networked together to provide a continuous coverage of a band of the earth, especially around the equatorial orbits. Although, eight satellites are shown as an example, the present invention is not limited to eight satellites and a different number of satellites, for example, four, twelve, sixteen or other number of satellites can be used for more coverage time per satellite and/or redundancy purposes. Each satellite of the MEO constellation is optically coupled to multiple nearest neighbors (for example, 4 or more, except in the minimal 4-ball constellation, where only 2 neighbors are visible) using LRMs functioning as inter-satellite lasercom (ISL) optical relays. In some embodiments, circular polarization or spectral diversity is used to provide dual optical signal paths per telescope. In some embodiments, circular polarization is used to separate transmitted signals from received signals.

Different spectral regions can also be used to allow four or more paths per ISL optical telescope, with minimal impact on the complexity of the network channel assignment. The ISL optical telescopes are capable of adjusting their elevation angle to allow (accommodate) a different angle of optical communication to accommodate adding or removing satellites (i.e., changes in the number of the satellites in the constellation) from the ring (constellation) and re-phasing the satellites that are currently in use.

For example, in the case of a new satellite being launched into the constellation, one or more commands for modifying the trajectory and reconfiguring the inter-satellite and ground optical communications (telescopes) are sent, for example, from a ground telescope in a ground site to each satellite.

In some embodiments, each satellite is connected to multiple ground sites using up/down-link optical telescopes. An exemplary minimum possible configuration may be a single up/down-link telescope per satellite, however, multiple telescopes increase the overall capacity of the network and would provide a larger revenue stream. The host satellite can easily support at least four up/down-link telescopes, although six or eight telescopes may be desired in some embodiments. Connections are scheduled so that at least one up/down-link telescope is free whenever the ground connection from a preceding satellite in the constellation is nearing an end, allowing the network to establish a new connection before breaking the old one, that is, a "Make-Before-Break" scheme.

Site diversity on the ground is used to mitigate weather outages, with multiple (two or more) terminals (ground optical telescopes) in relatively close proximity to each other, for example, within a few hundred kilometers of the associated ground gateway. Two of these ground terminals/telescopes are selected for each pass of an optically connected satellite to the ground site, based on predicted cloud-free line of sight probability for the pass. These two ground terminals may be tracked by separate up/down-link telescopes on the satellite, but it would also be possible to utilize a dual-tracking system with a field of view large enough to cover both ground terminals simultaneously by a single telescope. In some embodiments, dual polarization is used as one approach to distinguishing between the signals from the two ground terminals when spatial separation is inadequate. In some embodiments, different spectral bands can be used for the beacons.

In addition, each ground site would have at least two up/down-link telescopes so that new connections can be established before the old one is broken, as the satellite constellation passes the ground site. This way, the satellite constellation has a high availability by using site diversity, with monitoring and real-time switching between separate ground terminals supporting a single gateway/site. During a pass, the up/down-link telescopes continuously and in real time track both current ground sites/terminals, using an optical beacon, and send data to the one with the clearest line of sight. The multiple (e.g., two or more) ground terminals in relatively close proximity to each other are in direct communication with a shared gateway via wired or wireless, electrical or optical communication schemes. For example, the gateway may be located in a carrier hotel or other site with multiple connections to local high speed Internet networks.

In some embodiments, each of the ground terminals includes a telescope and antenna system for steering the optical beams at the one or more of the satellites. In some embodiments, ground-based gimbaled lasercom terminals/telescopes track individual satellites during each pass. In some embodiments, a network operations center sends up one or more switching commands to configure the data paths to maintain continuous connectivity between desired ground sites, with extra links used to make new connections before the old ones are dropped as the satellites orbit around the earth.

Figure 2:
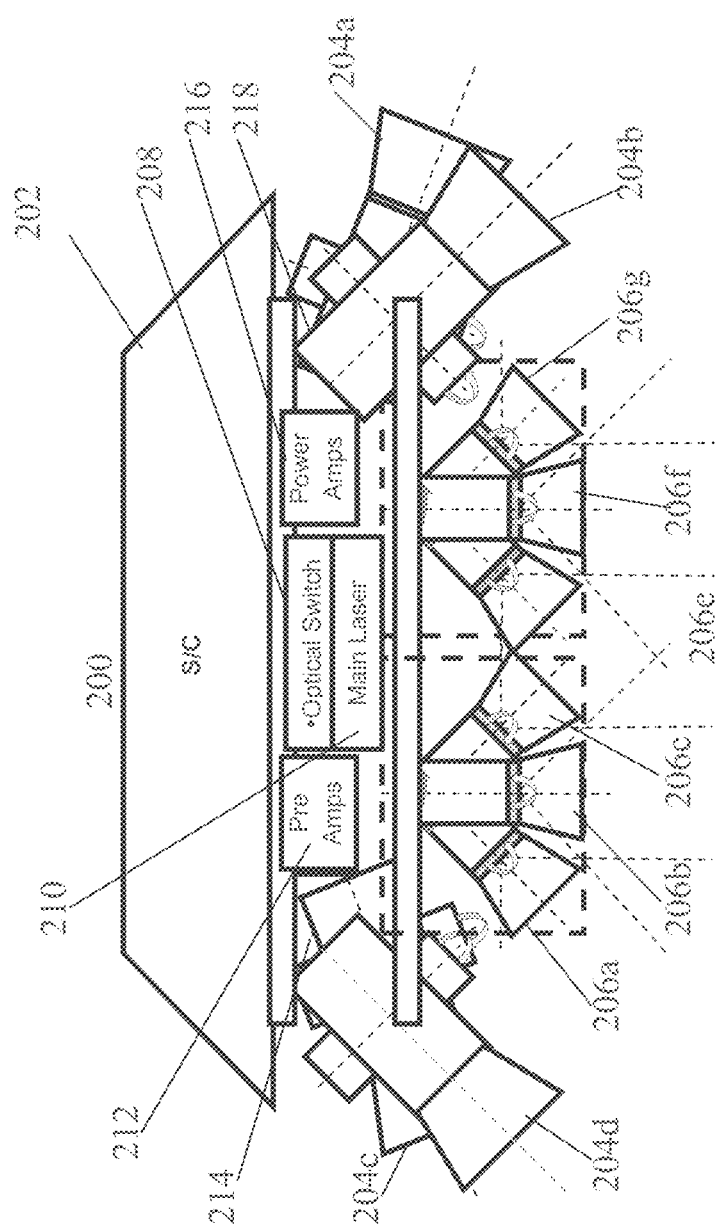
FIG. 2 is an exemplary layout view of a satellite payload including cross link and up/down telescopes, according to some embodiments of the present invention.

FIG. 2 is an exemplary layout view of a satellite payload 200 including cross link and up/down telescopes, according to some embodiments of the present invention. As shown, a plurality of inter-satellite (cross link) telescopes 204a to 204c (four shown in this exemplary figure) are installed on an exterior portion of each satellite for inter-satellite optical communications. In this example, telescopes 204a and 204b are located at the right side of the satellite and communicate with one or more of its nearest neighbor satellites on its right side. For example, 204a would point to and communicate with the nearest neighboring satellite (i.e., adjacent satellite) on that side and 204b would point to and communicate with the next nearest neighboring satellite (i.e., two satellites away) on that side. Similarly, telescopes 204c and 204d are located at the left side and communicate with one or more of its nearest neighbor satellites on its left side. Each of the cross link telescopes are capable of being selectively steered for calibrating the optical communication with the neighboring satellites, and/or in the case of a new satellite being added to the constellation, for establishing new optical communication with the new satellite. That is, the inter-satellite optical links connect the respective satellite in a redundant network.

In some embodiments, the cross link telescopes 204a to 204d include adjustable elevation settings to track the neighboring satellites in the constellation. In some embodiments, two nearest neighbors and two next-nearest neighbors are utilized for inter-satellite communications. Beam steering mirrors used to compensate for host satellite jitter and slight orbit differences. Elevation adjustment is used on an infrequent basis to add or drop satellites into the constellation and communication ring. Since the cross link telescopes are a shared resource, several methods are appropriate for using polarization and coarse wavelength separation to combine signals into a cross-link and then separate the data after transmission. In some embodiments, four or more signal bundles share the same cross-link telescope.

Additionally, there are a plurality of up/down link telescopes 206a to 206g (six shown in this exemplary figure) installed on the exterior portion of each satellite for ground communication and site diversity. Another up/down link telescope either on the same satellite or a connected satellite is used for the other end of the connection. In some embodiments, the up/down link telescopes 206a to 206g are gimbaled telescopes or telescopes with coelostats on each satellite to track a ground site and establish a high-bandwidth link. In some embodiments, Dense Wavelength Diversity Multiplexing (DWDM) is used to provide bi-directional 100 Gbps (or more) in bandwidth links with each ground site. Polarization and/or wavelength diversity is also used to isolate the two data streams. The site diversity is used to reduce outages due to clouds within the line of sight. Each telescope has dual internal steering mirrors to maintain track on two receive ground telescopes within a 100 km radius of a central point, which is tracked by the gimbal or coelostat. These two ground telescopes can be selected from a larger set before each satellite pass.

In some embodiments, the up/down link telescopes are small optical telescopes (for example, about 15-20 cm diameter aperture) either on gimbal or using a coelostat to track the ground sites. Multiple beam steering mirrors and control loops allow each up/down link telescope to simultaneously track two terminals within a 100 km radius of the ground site, which may be selected on each pass from a larger list of available terminals. In some embodiments, the ground optical telescopes are larger, for example, nominally 100 cm diameter, which may eliminate coelostats as an option for steering the beams from these large telescopes. In some embodiments, the inter-satellite links are established by larger, for example, about 30 cm, version of the LRM. The cross link telescopes used for nearest neighbor connections may be smaller than those used for more distant next-nearest neighbors, to keep the rest of the hardware identical and reduce payload mass. In some embodiments, it is desirable to keep all LRMs identical to maximize economy of scale and reduce developmental Non-Recurring Engineering costs.

The optical on-board hardware (payload) of each satellite includes a plurality of optical pre-amplifiers 212, an optical switch matrix 208, one or more main amplifiers 210, a plurality of power amplifiers 216, a Command, Control, And Telemetry (CC&T) subsystem 214, and a power supply 218. In some embodiments, the optical pre-amplifiers 212 and power amplifiers 216 support a fixed number (for example, 10) of independent 10 Gbps channels with acceptable crosstalk and sufficient total amplification to provide acceptable signal-to-noise ratio (SNR) or photons per bit, at each receiver. In other embodiments, the laser pump power is scalable so that the number of channels per amplifier can be adjusted to accommodate different demands for bandwidth. The amplifiers may be Erbium-Doped Fiber Amplifiers (EDFAs), Planar Waveguides (PWGs), Raman amplifiers, Semi-Guiding High Aspect Ratio Core (SHARC) fiber laser amplifier, other technologies, or a combination thereof. Some combination of various optical amplifiers can be packaged as a multi-stage optical amplifier.

Each of the plurality of satellites includes optical circuitry/hardware for optically processing and switching incoming and outgoing optical signals without converting the optical signals into electrical signals. The on-board hardware receives an incoming optical data stream from the ground and/or one or more neighboring satellites, optically regenerates it, uses optical switches to direct it to the desired (selected) output path, and sends it toward its final destination (ground and/or one or more neighboring satellites). Regeneration of the incoming optical data stream includes re-amplification (by the optical pre-amplifiers 212, the main amplifiers 210 and the power amplifiers 216), all in optical domain. That is, the amplification of the optical data stream is accomplished without ever converting to electrical signals within each satellite payload, and transparently to data modulation schemes. The on-board hardware is capable of operating in C-band, L-band and other optical bands, and reshaping and re-phasing the optical data stream.

In some embodiments, channel separation of about 50 GHz with Dense Wavelength Division Multiplexing (DWDM) is used to provide at least 80 10-GHz channels. However, more channels and higher bandwidth per channel (using more complicated modulation schemes) are possible and are within the scope of the present invention. The optical switch matrix 208 allows each optical input to be optically coupled to any other output channel. In some embodiments, the optical switch matrix 208 is capable of switching whatever signal it receives on each input, including entire bundles of channels, in some embodiments, demultiplexing, switching at the individual channel level, and re-multiplexing are performed to allow switching each individual channel. The on-board optical switch matrix 208 also allows establishing and updating network optical paths as the satellite constellation passes over the ground sites.

One or more main lasers 210 are used on each satellite as part of the amplification chain for the optical signals on each satellite. In some embodiments, where the channels are all multiplexed together, the main amplifier may require as much power as the final power amplifiers. In other embodiments, in which each connection has its own amplifier chain, the main amplifiers require significantly less power than the final power amps. A more detailed description of the optical signal processing hardware is disclosed in a co-pending, co-owned U.S. patent application Ser. No. 13/549,191, the entire content of which is hereby expressly incorporated by reference.

Figure 3:
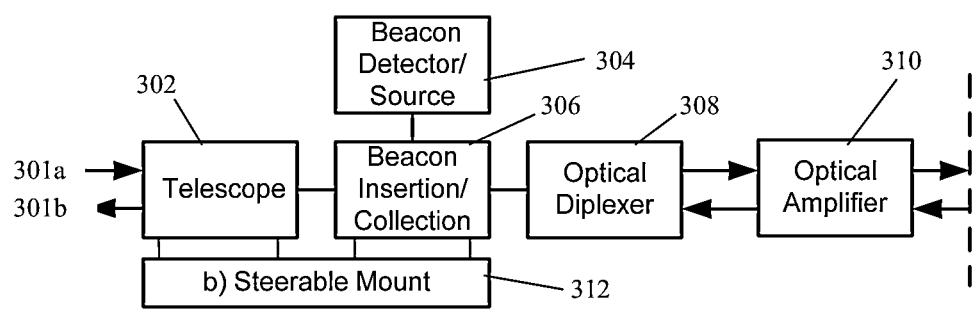
FIG. 3 is a simplified block diagram for an exemplary laser relay module, according to some embodiments of the present invention.

FIG. 3 is simplified block diagram for an exemplary laser relay module, according to some embodiments of the present invention. One or more of the exemplary laser relay module may be used as a network node in an optical communication network, for example on a satellite, airborne, ground, and/or waterborne platform. As shown, an optical telescope 302 is mounted on a steerable mount 312, for example, one or more gimbals for receiving and transmitting optical beams 301a and 301b, respectively. An optical diplexer 308 separates transmitting and received optical beams and an optical amplifier 310 restores the signal level of the received optical beam to a predetermined level for a transmitting beam.

In some embodiments, the optical diplexer 308 may be a combination of free-space optical elements and fiber optical elements. For example, the optical diplexer may convert the signal beam from free space to fiber transport. In some embodiments, the optical diplexer 308 is configured to use a combination of polarization, wavelength, and beam propagation direction to separate the transmitting and received optical beams. In some embodiments, the optical amplifier 310 includes multiple stages of optical amplification or separate optical amplifiers that are optimized for low-noise amplification and large-signal amplification.

A modulated beacon laser shown in a simplified form as a beacon source 304 is used for line of sight control of a plurality of communicating remote network nodes, and for optical transmission of status, system management, and telemetry data to other network nodes. The beacon laser may be modulated directly, or is a continuous wave laser that is modulated with an external element (not shown). Moreover, a beacon beam detector 304 detects an incoming beacon optical beam for line of sight control of the optical telescope and receives status, system management, and telemetry data from other network nodes. In some embodiments, the beacon beam detector 304 determines the angle of arrival of the received beacon beam using a quadrant detector, focal plane array, or optical nutation.

A beacon insertion/collection module 306 inserts an output of the modulated beacon laser into the optical telescope 302 for transmission to another network node. The beacon insertion/collection module 306 also collects the incoming beacon optical beam 301a at the optical telescope and transports the incoming beacon optical beam to the beacon detector 304. In some embodiments, the beacon insertion/collection module 306 uses a combination of free-space and fiber optical elements are used for inserting the transmitting optical beacon into the optical telescope and extracting the received optical beacon from the optical telescope.

Figure 4:
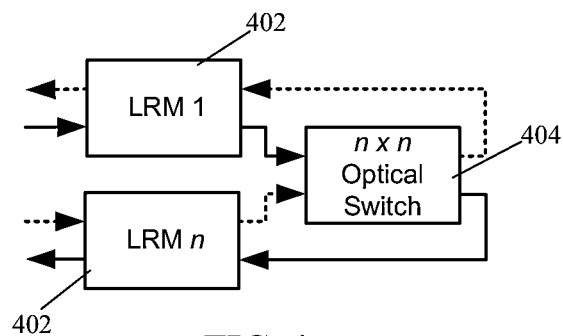
FIG. 4 is a simplified block diagram for an controlling several laser relay modules, according to some embodiments of the present invention.

FIG. 4 is a simplified block diagram for a controlling several laser relay modules, according to some embodiments of the present invention. As shown, an n×n optical switch 404 controls the connections among n LRMs 402. The optical switch is non-blocking, so that any input port can be connected to any unused output port, without concern for how any of the other output ports are connected. In some embodiments, the optical switch is constructed from an array of simpler 2×2 optical switches, and the control of the larger unit includes setting all of the simpler optical switches so that the overall connectivity is achieved. In some embodiments, the optical may be configured such that it can route the signal received by any (of the n) LRMs to any two or more LRM for transmission. Multiple transmit paths are desirable to avoid weather or other blockages of the transmit beam.

Figure 5:
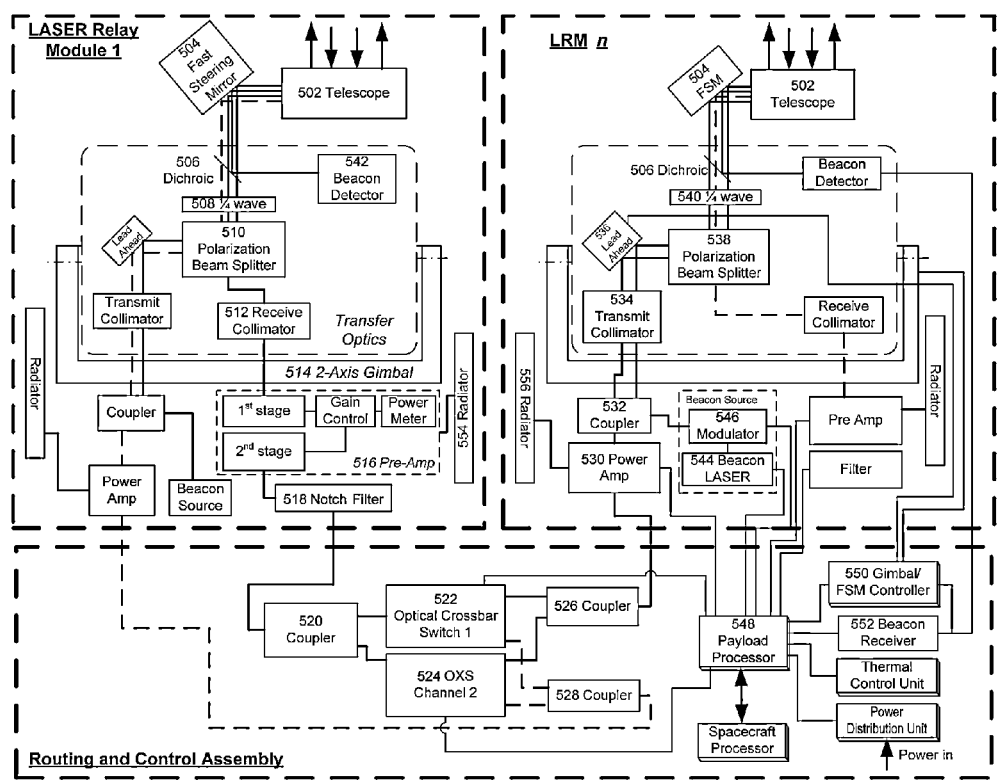
FIG. 5 is a block diagram for a payload arrangement of a laser relay module, according to some embodiments of the present invention.

FIG. 5 is an diagram of a payload arrangement of a laser relay module, according to some embodiments of the present invention. Laser relay module (LRM) 1 is depicted in a receiving mode and LRM n is depicted in a transmitting mode for simplicity reasons. As shown, the receive signal enters the LRM telescope 502, which collects a portion of the beam transmitter from the ground and reduces the size (diameter) of the signal beam so that it can more easily be routed to the other components. After the telescope, the signal beam reflects off a fast steering mirror 504, which adjusts for fine pointing and base motion disturbances of the light beam signal. In some embodiments, the beacon collection function may be performed by a dichroic beam splitter 506 that route the beacon to a detector 542 that is used to stabilize the beam signal and is configured to receive encoded command signals.

In some embodiments, the optical diplexer includes a quarter wave plate that transforms the randomly polarized received beam to a beam with linear polarization. A polarization beam splitter 510 is designed to pass one polarization, the receiver beam, and reflect the opposite polarization, the transmit beam. At this point, the beam is converted from free-space (transmission through air or vacuum) to fiber space (transmission through optical fiber). This is done by the receive collimator 512 which includes a fiber optic entry fitting. The optical fiber cable routes the beam off the steerable mount which takes the form of, for example, a 2-axis gimbal 514 to an optical preamplifier 516, in some embodiments, the optical pre-amplifier 516 includes multiple gain stages to increase the signal strength to a reasonable level for transport through the signal routing and control assembly and return with good signal strength. The optical preamplifier 516 may also include automatic gain control to account for variations in the input signal that could be due to atmospheric scintillation and to output a near constant power level.

After the pre-implication or between one of the amplification stages, a programmable notch filter 518 is used to remove as much noise as possible. That is, to remove noise in between the operating bands. Removing this interband noise improves the efficiency of the downstream optical power amplifier 530, because the optical power amplifier will not be amplifying the noise. In some embodiments, after the notch filter 518, a coupler 520 splits the signal and sends to two or more optical switches 522 & 524. Switch 526 routes the beam signal to any commanded output channel while switch 524 routes the beam signal to an alternate path for spatial diversity. In some embodiments, another coupler 526 allows the output from either switch to be sent to any LRM on the platform for transmission to the next node in the system.

The power amplifier 530 may increase the signal strength of the signal up to several watts per channel. The power amplifier 530 also includes a gain control circuit, which adjusts the signal strength, depending on the length and type of transport. A beacon laser 544 produces a beam for line of sight control. The beacon is also used for low rate command and control signals. In some embodiments, the communications signal is created by modulating 546 the laser beam. In some embodiments, the beacon and primary command signals are combined in coupler 532, routed on gimbal 514 to a collimator 534 that converts the beam to free space transport. A lead ahead mirror 536 is used to account for the distance that the platform moves during the transmit/receive round trip. The beam is aligned with the receiver beam in the optical diplexer 538 & 540, reflect off the FSM 504 and out the telescope 502.

Figure 6:
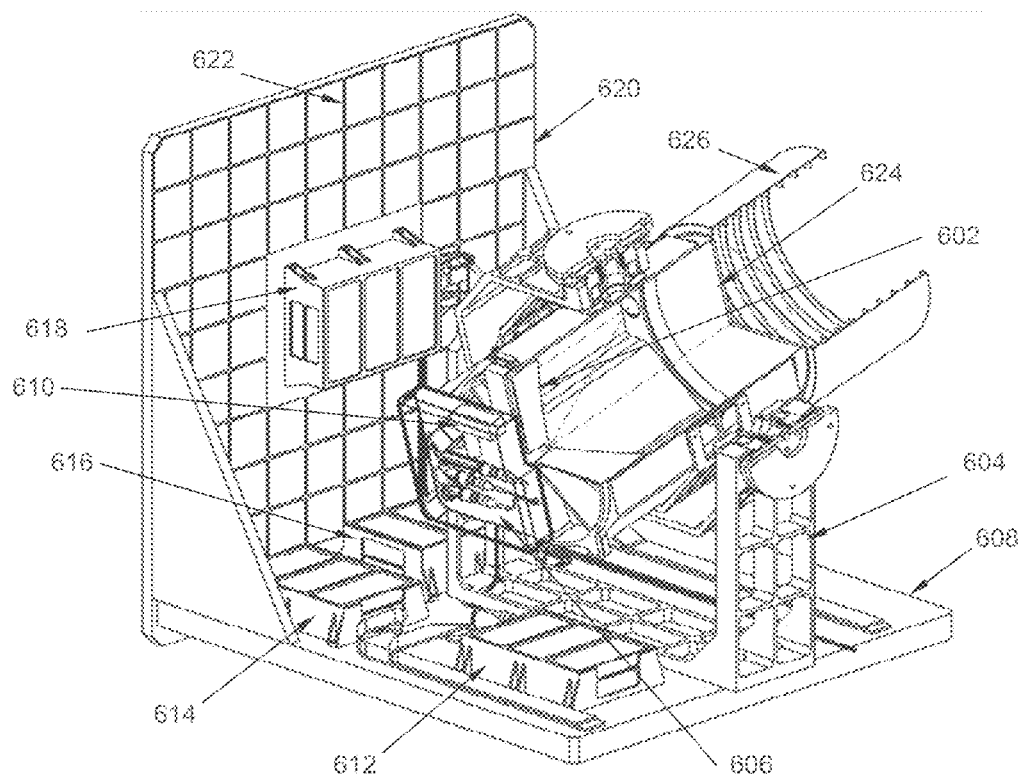
FIG. 6 is a simplified signal block diagram for a laser relay module, according to some embodiments of the present invention.

FIG. 6 is a simplified signal block diagram for a laser relay module, according to some embodiments of the present invention. As shown, an optical telescope 602 is mounted onto, for example, a 2-axis, gimbal 604 to provide 2-dimentional rotational flexibility. The telescope 602 and the steerable mount 604 are positioned on a support structure 608. The support structure interfaces to the host platform. It supports all components except the power amplifier 618 and acts as a thermal radiator to dissipate waste heat. An array of optical solar reflectors 622 are positioned on radiator panel 620 to minimize solar adsorption thereby enhancing heat rejection capability. An optical power amplifier 618 is mounted on a radiator panel 620. The optical power amplifier uses most of the LRM input power and therefore needs the most radiator surface area. Dedicating panel 620 allows the optical power amplifier to be cooled without affecting the other components. In some embodiments, a Fabry-Perot filter is used for suppression of Amplified Spontaneous Emission, which can become a dominant noise term if not controlled.

The radiator panel 622 is oriented to minimize Earth exposure while maximizing space view angle. The optical power amplifier is programmable to set the needed output beam power for the desired transmission. A modulated beacon laser 612 is positioned on the support structure 608 to control line of sight of a plurality of communicating remote LRMs, and for optical transmission of status, system management, and telemetry data to other LRMs, for example, in other nodes of an optical network. A beacon beam detector 610 is positioned on the transfer optics assembly 606 which is attached to the telescope 602 and moves with the gimbal 604.

The beacon detector measures an incoming beacon optical beam for line of sight control of the optical telescope 602 and to receive status, system management, and telemetry data from other network nodes. A programmable notch filter 614 is used to remove noise that would otherwise reduce system efficiency. In some embodiments, the transfer optics 606 includes dichroics, beam splitter, fiber optics collimators, a fast steering minor, and a lead ahead mirror shown in more clearly in FIG. 5. The telescope 602 is protected by a window 624 and a baffle 626. The window 624 includes a solar rejection filter that minimizes the out of band energy that enter the telescope. The baffle 626 reduces the direct exposures of the window & telescope to Sun, Earth and space thermal loading. The telescope gimbal assembly is constructed from a common material to make it insensitive to temperature variations. The arrangement of the gimbal 604 axis allows it to stow for launch or shipping and point a full 180 degrees with no control outages which enables pointing to desired ground locations or to other satellites in the constellations without any configuration changes. In some embodiments, the telescope is reflective which allows a range of optical wavelengths to be transmitted without distortion or varying losses. The LRM packaging minimizes the volume needed to create a standalone assembly that is fully functional as a optical relay device.

The implementation of an all-optical relay in space, according to embodiments of the present invention, reduces the size, weight, and power of the payload. The optical switches in space, with varying levels of switching complexity, allow fully transparent or fully flexible worldwide network connectivity. The use of multiple inter-satellite link telescopes adds network redundancy, while the addition of an elevation adjust mechanism to these telescopes allows new satellites to be added at any time and failed satellites to be removed from the network. The use of multiple up/down link telescopes allows each satellite to support multiple ground sites within its moving area of responsibility, while the use of dual line-of-sight control loops within each telescope's field of view adds local area site diversity to reduce the impact of clouds. That is, each up/down link telescope can simultaneously track two local area sites, and use whichever one has the clearer line of sight.

Furthermore, the on-board optical hardware of the present invention provides transparent relay of the incoming bit stream and accommodates evolution and revisions in standards over the operational life of the host satellites, because the optical bent pipe is independent of any standards and therefore any changes in the standard is accommodated by the changes in the ground hardware.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A laser relay module for free space optical communications comprising:
   an optical telescope mounted on a steerable mount for receiving and transmitting optical beams;
   an optical diplexer for separating transmitting and received optical beams;
   an optical amplifier for restoring a signal level of the received optical beam to a predetermined level for a transmitting beam;
   a modulated beacon laser for line of sight control of a plurality of communicating remote network nodes, and for optical transmission of status, system management, and telemetry data to other network nodes;
   a beacon beam detector for detecting an incoming beacon optical beam for line of sight control of the optical telescope and receiving status, system management, and telemetry data from other network nodes; and
   means for inserting an output of the modulated beacon laser into the optical telescope for transmission to another network node, and for collecting the incoming beacon optical beam at the optical telescope and transporting the incoming beacon optical beam to the beacon detector.

2. The laser relay module of claim 1, wherein the optical diplexer is a combination of free-space optical elements and fiber optical elements.

3. The laser relay module of claim 1, wherein the optical diplexer is configured to use a combination of polarization, wavelength, and beam propagation direction to separate the transmitting and received optical beams.

4. The laser relay module of claim 1, wherein the optical amplifier comprises of multiple stages of optical amplification or separate optical amplifiers optimized for low-noise amplification and large-signal amplification.

5. The laser relay module of claim 1, wherein the beacon laser is modulated directly, or is a continuous wave laser that is modulated with an external element.

6. The laser relay module of claim 1, wherein the beacon detector determines the angle of arrival of the received beacon beam using a quadrant detector, focal plane array, or optical nutation.

7. The laser relay module of claim 1, further comprising means for wavelength division multiplexing to provide a plurality of communications channels at different wavelengths for the transmitting and the received optical beams.

8. The laser relay module of claim 1, further comprising one or more optical filters to improve optical amplifier efficiency and improve signal-to-noise ratio.

9. The laser relay module of claim 8, wherein said one or more optical filters are configured to remove optical noise from between a plurality of optical channels at different wavelengths.

10. The laser relay module of claim 1, wherein the laser relay module is mounted on a satellite, airborne, ground, or waterborne platform.

11. The laser relay module of claim 1, further comprising an array of optical solar reflectors positioned on a radiator panel to minimize solar adsorption.

12. The laser relay module of claim 1, further comprising a support structure configured to act as a thermal radiator to dissipate waste heat.

13. The laser relay module of claim 1, wherein the optical amplifier includes an optical power amplifier mounted on a radiator panel.

14. The laser relay module of claim 13, wherein the radiator panel is oriented to minimize earth exposure while maximizing space view angle.

15. The laser relay module of claim 13, wherein the optical power amplifier is programmable to set needed output beam power.

16. The laser relay module of claim 1, wherein the optical power amplifier is mounted on a dedicated panel to allow the optical power amplifier to be cooled without affecting other components.

17. The laser relay module of claim 1, further comprising a Fabry-Perot filter configured to suppress amplified spontaneous emission.

18. The laser relay module of claim 1, wherein the optical telescope includes dichroics a beam splitter, fiber optics collimators, a fast steering mirror, and a lead ahead mirror.

19. The laser relay module of claim 1, wherein the modulated beacon laser is positioned on a support structure to control line of sight of a plurality of communicating remote LRMs and for optical transmission of status, system management, and telemetry data to other LRMs.

20. The laser relay module of claim 1, wherein the beacon beam detector is positioned on a transfer optics assembly is attached to the optical telescope and is configured to move with the steerable mount.

* * * * *